(12) United States Patent
Pi et al.

(10) Patent No.: US 6,549,713 B1
(45) Date of Patent: Apr. 15, 2003

(54) STABILIZED AND INTEGRATED FIBER DEVICES

(75) Inventors: Bo Pi, Carlsbad, CA (US); Shulai Zhao, Encinitas, CA (US)

(73) Assignee: Oluma, Inc., Carlsbad, CA (US)

( * ) Notice: Subject to any disclaimer, the term of this patent is extended or adjusted under 35 U.S.C. 154(b) by 1 day.

(21) Appl. No.: 09/894,971

(22) Filed: Jun. 27, 2001

Related U.S. Application Data

(60) Provisional application No. 60/214,590, filed on Jun. 27, 2000, and provisional application No. 60/214,681, filed on Jun. 27, 2000.

(51) Int. Cl.[7] .................................................. G02B 6/00
(52) U.S. Cl. ......................... 385/137; 385/52; 385/50; 385/65; 385/83
(58) Field of Search ........................... 385/50–52, 14, 385/15, 137, 134, 147, 65, 83

(56) References Cited

U.S. PATENT DOCUMENTS

| | | | | |
|---|---|---|---|---|
| 4,669,814 A | * | 6/1987 | Dyott ........................... | 385/42 |
| 5,519,803 A | * | 5/1996 | Shiono et al. ............... | 385/132 |
| 5,533,158 A | * | 7/1996 | Han et al. ...................... | 385/88 |
| 5,703,980 A | * | 12/1997 | MacElwee et al. ........... | 385/49 |
| 6,368,441 B1 | * | 4/2002 | Yamada ....................... | 156/178 |

\* cited by examiner

Primary Examiner—Hemang Sanghavi
Assistant Examiner—Scott A Knauss
(74) Attorney, Agent, or Firm—Fish & Richardson, P.C.

(57) ABSTRACT

Techniques for forming fiber devices that engage fibers to a substrate with similar material properties. A semiconductor template may be used to define positions and orientations of the fibers.

29 Claims, 5 Drawing Sheets

Pressure to Press Material-Matched Substrate
Against Aligned Fibers on Silicon Template

FIG. 3

```
┌─────────────────────────────────────────────┐
│ Process a Si substrate as an alignment      │
│ template to form one or more V-grooves at   │
│ desired positions and orientations for one  │
│ or more fibers to be placed on a            │
│ material-matched substrate                  │
└─────────────────────────────────────────────┘
                      ↓
┌─────────────────────────────────────────────┐
│ Place fibers in the V-grooves of the        │
│ processed Si alignment template             │
└─────────────────────────────────────────────┘
                      ↓
┌─────────────────────────────────────────────┐
│ Place the material-matched substrate over   │
│ and in contact with the fibers positioned   │
│ in the Si alignment template                │
└─────────────────────────────────────────────┘
                      ↓
┌─────────────────────────────────────────────┐
│ Bond the fibers to the material-matched     │
│ substrate at respective contact locations   │
└─────────────────────────────────────────────┘
                      ↓
┌─────────────────────────────────────────────┐
│ Remove the Si alignment template from the   │
│ fibers                                      │
└─────────────────────────────────────────────┘
```

STABILIZED AND INTEGRATED FIBER DEVICES

This application claims the benefit of U.S. Provisional Application, No. 60/214,590 entitled "AN ENVIRONMENTALLY STABILIZED AND HIGH PRECISION INTEGRATED FIBER ARRAY ALIGNMENT TECHNIQUE" and 60/214,681 entitled "MULTI-PURPOSE THIN FILM TECHNIQUE FOR FIBER OPTIC DEVICE FABRICATION," both filed on Jun. 27, 2000.

BACKGROUND

This application relates to optical fibers and fiber devices with one or more fibers engaged and aligned on substrates.

Optical fibers can be used to transmit or process light in a variety of applications, including delivering light to or receiving light from integrated optical components or devices formed on substrates, transmitting information channels in wavelength-division multiplexed optical communication devices and systems, forming fiber optic switch matrix devices or fiber array to array connector, and producing optical gain for optical amplification or laser oscillation. In some applications, it is desirable to place one or more fibers on a substrate, such as a semiconductor substrate.

For example, in an array waveguide grating (AWG) or wavelength grating router (WGR), input and output dielectric waveguides are usually formed over a silicon substrate to, e.g., direct received WDM channels to designated output waveguides, or to simultaneously receive different input signals at the same optical carrier wavelength to different input ports of the waveguides. Typically, such multi-channel AWG systems can be fabricated by silica-on-silicon technique in which each waveguide is formed of a high-index silicon compound core sandwiched between two cladding layers formed from a low-index silicon compound. This waveguide structure is fabricated over a crystal silicon substrate. Silicon dioxide compounds may be used to form the waveguide core and the cladding layers. When used in a fiber optic system, an AWG device is interfaced with optical fibers. The fibers are generally bonded to either the same silicon substrate on which the AWG is formed or a separate silicon substrate and are then coupled to the waveguides in a pigtail configuration.

SUMMARY

The present disclosure includes structures that integrate one or more fibers to a substrate whose material properties match, or are similar to, the properties of the fiber. Hence, when properly engaged, the integrated fiber and the substrate respond similarly to the environmental changes. As a result, the structure is relatively stable. Special techniques are also provided to use an alignment template formed of a material such as silicon for precisely aligning the fibers on the substrate and for fabricating the structures.

BRIEF DESCRIPTION OF THE DRAWINGS

FIG. 3 shows a flow chart for one exemplary fabrication process for the fiber device in FIG. 1A.

DETAILED DESCRIPTION

The devices and techniques of the present disclosure are in part based on the recognition that fiber materials are generally different from substrate materials and hence the thermal, mechanical, aging, and other characteristics of a fiber and a substrate to which the fiber is engaged are generally different. For example, the coefficient of thermal expansion (CTE) of silicon substrate (about $2.6 \times 10^{-6}/°$ C.) is about five times higher than that of an optic fiber made of fused silica glass (about $0.5 \times 10^{-6}/°$ C.). Under the same environmental conditions, the responses from the fiber and the underlying substrate are different and thus may cause stresses at the interface of the fiber and the substrate.

Such stresses may change the position or orientation of the fiber, cause geometrical distortion in the fiber, and even damage the fiber when the stresses are above a threshold level. Consequently, the material mismatch may adversely affect the alignment of the fiber to a waveguide, a lens, or other optical component in the system, the overall efficiency of the optical coupling into or out of the fiber, and may lead to catastrophic bonding failure. In absence of device failure, the material mismatch may also cause the fiber alignment and coupling efficiency to vary with environmental conditions.

Figure 1A:
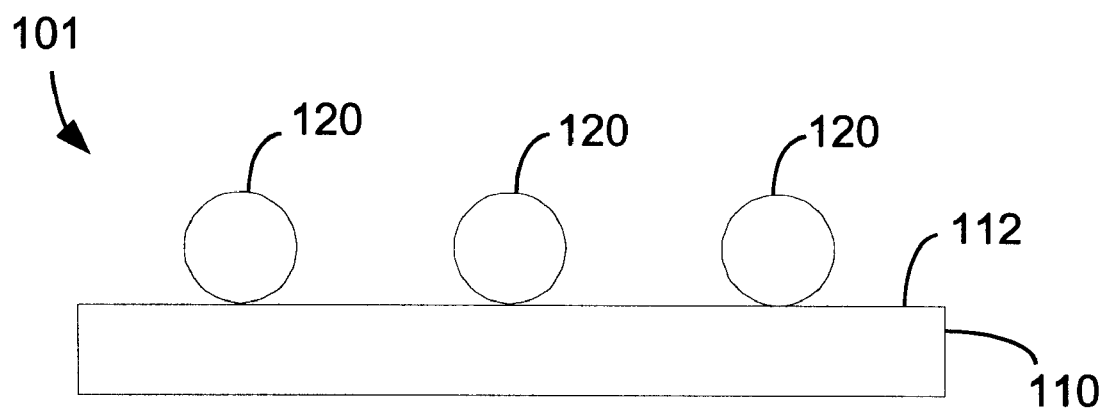
FIGS. 1A and 1B illustrate two embodiments of fiber devices that engage fibers on material-matched substrates.
Figure 1B:
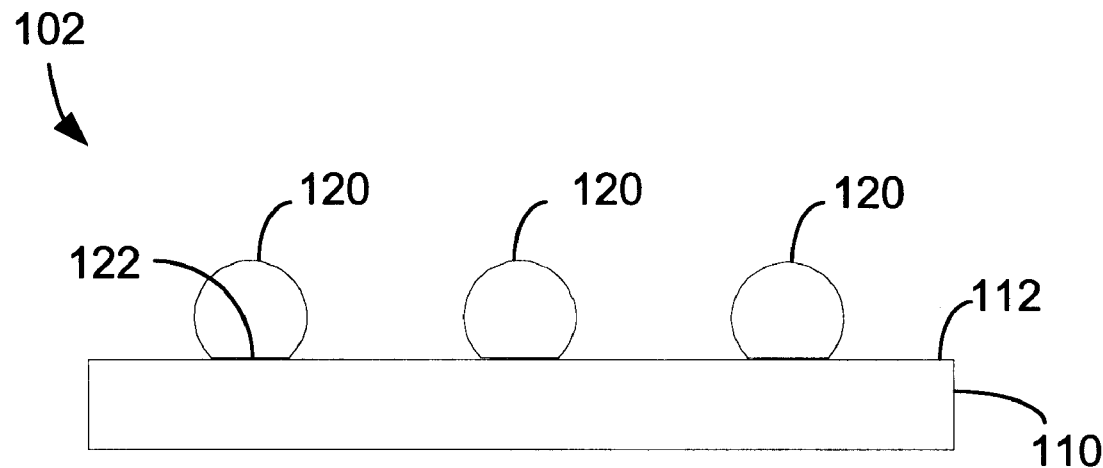

FIGS. 1A and 1B show two embodiments of integrated fiber devices where one or more fibers 120 are engaged to a substrate 110 whose material properties match or similar to those of the fiber material. For example, the substrate 110 may be formed of a fused silica glass that is used to form the fibers 120 so that the responses of the substrate 110 and fibers 120 to temperature fluctuations, aging, and other factors are substantially the same or similar. The CTE values of the substrate 110 and the fiber material, for example, may be identical or similar to reduce the geometrical deformation, shift in position and orientation, or even breakdown of the bondage between the fiber and the substrate due to variations in temperature. The CTE value for the substrate 110, for example, may be less than the CTE value of silicon. Such designs can significantly reduce the stresses between the substrate 110 and the fibers 120 to maintain the proper alignment, device performance, stability, and device lifetime. In this context, the substrate 110 is referred herein as to be material matched to the fiber material.

In the fiber device 101 shown in FIG. 1A, one side surface of each fiber 120, generally in a cylindrical shape, is bonded to a flat surface 112 of the substrate 110. The bonding between each fiber 120 and the surface 112 may be achieved by various methods. For example, a proper adhesive or epoxy may be applied to the contact area between the fiber 120 and the substrate 110; and $CO_2$-assisted direct welding may be used bond the fiber 120 to the substrate 110 in which silica glass frit may be used to assist the welding process. In addition, silica sol-gel assisted welding may also be used, where a thin coat of a liquid material containing silica, e.g., a silica sol-gel which may be an organic polymer of silicate network, is coated on the fibers 120 and the surface 112 of the substrate 110. Heat can be applied to the assembly to transform the liquid silica sol-gel into a solidified state as a solid glass at a certain temperature. This produces the bonding between the fibers 120 and the substrate 110.

In the fiber device 102 in FIG. 1B, the fiber cladding of one side of each fiber 120 is removed to form a flat contact surface 122. This flat contact surface 132 is then used to contact and to be bonded to the surface 112 of the substrate 110. Compared to the design in FIG. 1A, the surface 122 increases the contact area between each fiber 120 and the substrate 110 and hence can strengthen the bonding. Certainly, above bonding techniques may be applied in this design to bond the fiber 120 to the substrate 110 with improved bonding strength. In addition, when the materials for the substrate 110 and the fibers 120 are selected to allow for material diffusion with each other, e.g., both are fused silica glasses, the flat contact surface 122 also allows for direct diffusion bonding with greater ease than the diffusion bonding in the design in FIG. 1A. The substrate surface 112 and the flat surface 122 can be treated by using a pre-bonding activation process, which may include cleaning of the contact surfaces for such bonding (e.g., polishing), a wet chemical activation process, a plasma activation process, or an ultra vacuum activation process. During bonding, each contact area between each fiber 120 and the substrate 110 may be locally heated to promote the material diffusion so that a direct diffusion bond can be formed. For example, a laser beam may be directed to each contact location for heating. When the polished surfaces 112 and 122 are in contact, a direct diffusion bond can form to bond the fibers 120 to the substrate surface 112. A pre-bond surface treatment such as chemical or mechanical etching may be performed to clean the surfaces and promote the diffusion bonding.

One technical challenge in fabrication of the fiber devices 101 and 102 is to accurately orient and position each fiber 120 on the surface 112 of the substrate 110. If the substrate 110 were formed of semiconductors such as silicon or GaAs, or other crystalline materials, V-shaped grooves at pre-defined fiber positions may be formed on the surface 112 by performing a photolithographic process with a specially-designed mask. Hence, the position and orientation of each fiber 120 can be precisely defined in the patterns of the mask. This technique is known to be reliable and precise. The devices 101 and 102, however, generally do not allow for etching precision V-grooves directly on the material-matched substrate 110 because the substrate 110 is a fused silica glass for matching many widely-used commercial fibers in today's market.

One aspect of the present disclosure is to use a silicon or other crystalline substrate precisely fabricated with V-grooves at desired fiber positions and orientations as an alignment template. One or more fibers 120 are first positioned in the V-grooves of the alignment template. The material-matched substrate 110 is then placed over the fibers 120 that are still positioned in the V-grooves of the alignment template. Next, the fibers 120 are bonded to the substrate 110. Finally, the alignment template is removed from the fibers 120 to form the fiber device 101 in FIG. 1A or 102 in FIG. 1B. This process essentially transfers the pre-defined fiber positions on the alignment template to the material-matched substrate 110.

Figure 2A:
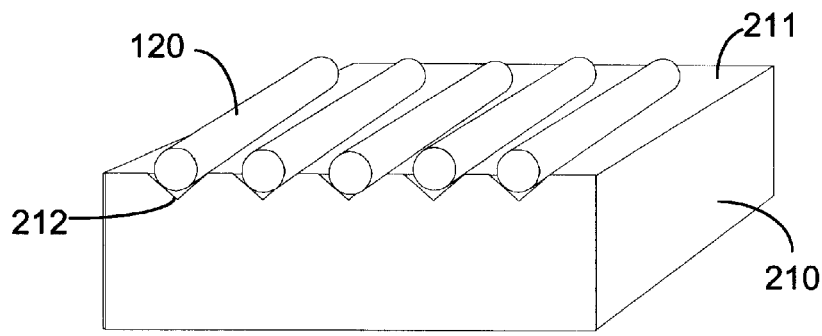
FIGS. 2A, 2B, and 2C illustrate fabrication of the fiber device shown in FIG. 1A according to one embodiment.
Figure 2B:
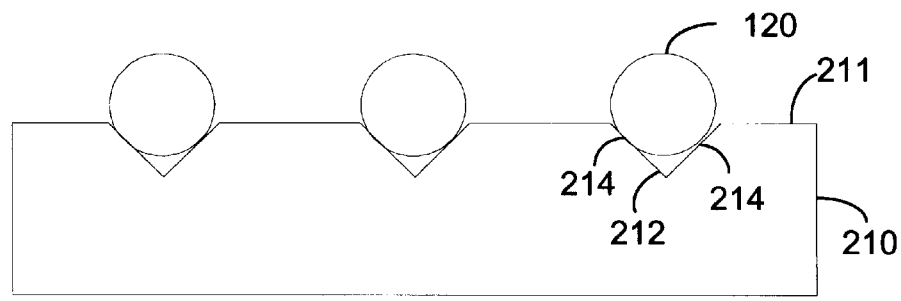
Figure 2C:
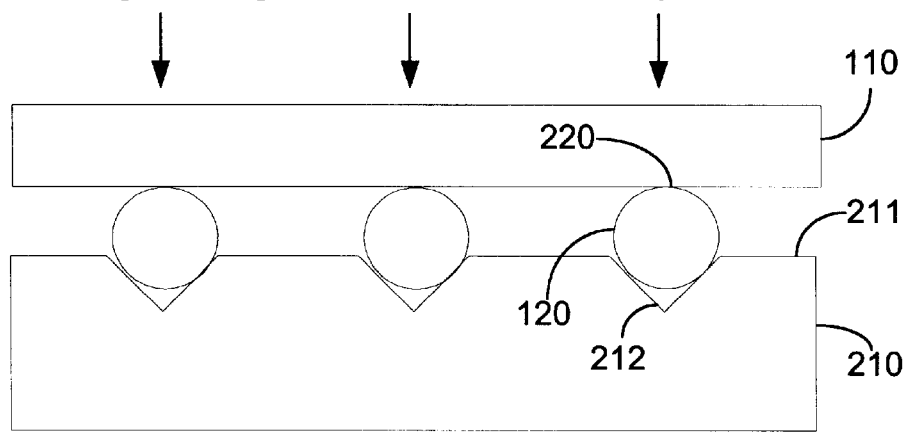

FIGS. 2A, 2B, and 2C illustrate the above process in an example where an array of parallel-positioned fibers 120 is to be bonded on the material-matched substrate 110. In FIGS. 2A and 2B, a silicon or other crystalline semiconductor substrate 210 is processed to have V-shaped grooves or grooves in other cross-sectional shapes 212 arranged relative to one another in a desired spatial pattern over a substrate surface 211. In this example, V-grooves 212 are parallel with a selected spacing. The fibers 120 are laid in the grooves 212 and hence are aligned at their desired positions. The material-matched substrate 110 is then placed over and is pressed with a pressure against the aligned fibers 120 so that the fibers 120, still confined in the grooves 212, are sandwiched between the substrates 110 and 210 and are in contact with each V groove 212 at contact locations 214. FIG. 2C shows that one side of each fiber 120 forms a contact location 220 with the substrate 110. In this embodiment, the fibers 120 are not bonded to the alignment template 210. Next, a suitable bonding process is performed to bond the fibers 120 to the substrate 110 at locations 220. After the bonding joint is cured, the applied pressure can be removed and the alignment substrate 210 may also be removed to form the device 101 in FIG. 1A. FIG. 3 shows a flowchart of the above process.

Alternatively, the fibers 120 may be temporarily bonded to the V-grooves 212 at location 214 on each surface or side wall of the V-groove 212 during the fabrication so that the fibers 120 are fixed without relying on the applied pressure to the substrate 110. After the bonding joint at each contact 122 is cured, the temporary bonding joint 214 between each fiber 120 and the alignment template 210 may be broken to remove the alignment template 210. In one implementation, chemical etching may be used to remove the silicon template 210.

Figure 4A:
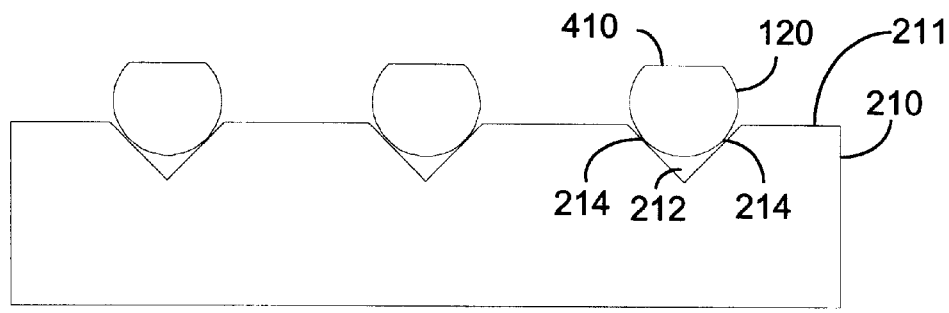
FIGS. 4A and 4B illustrate fabrication of the fiber device shown in FIG. 1B according to one embodiment.
Figure 4B:
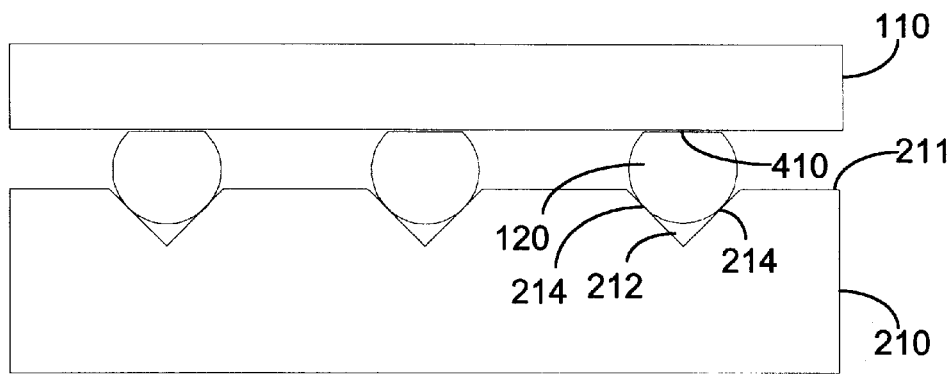
Figure 5:
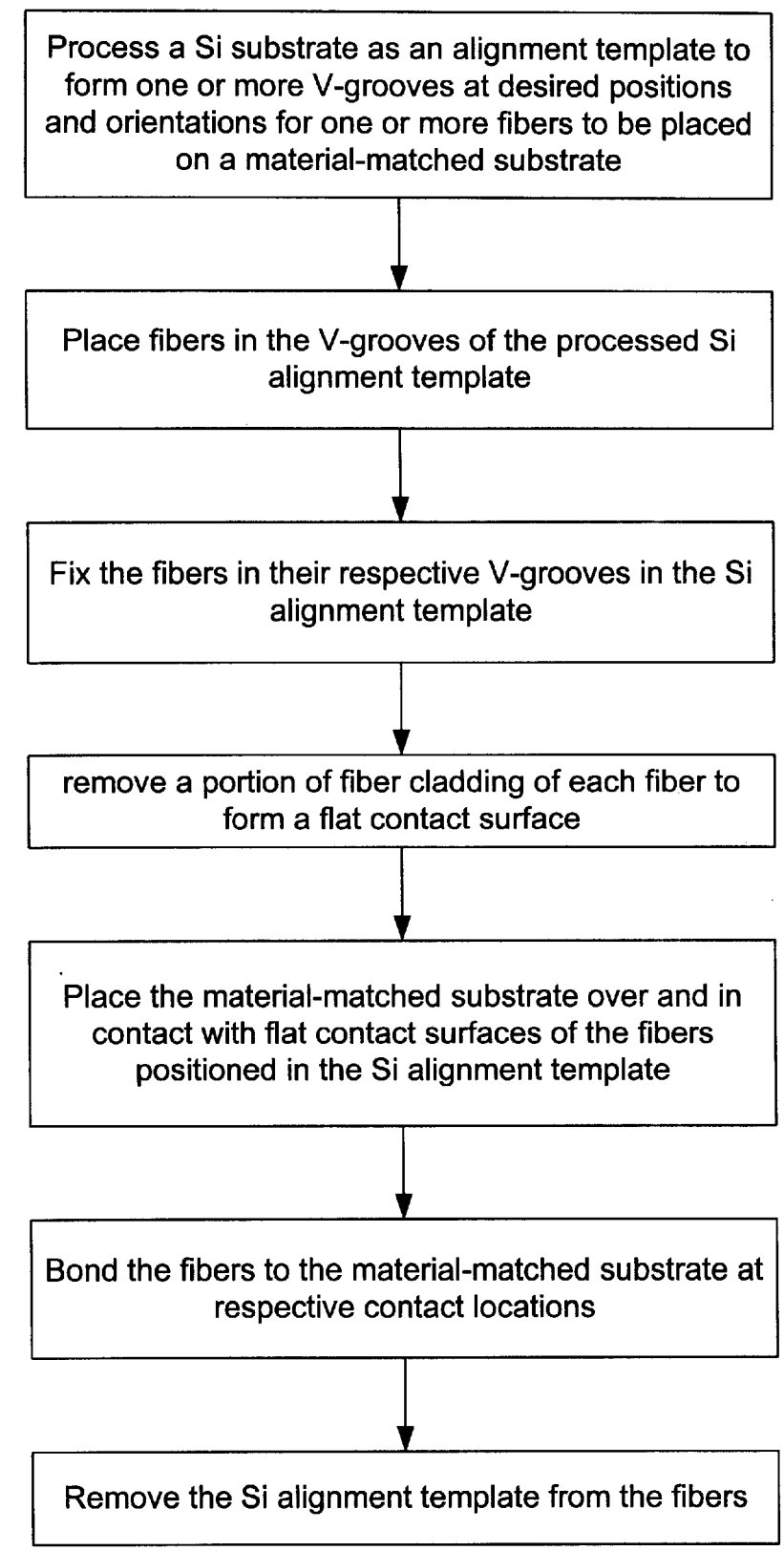
FIG. 5 shows a flow chart for one exemplary fabrication process for the fiber device in FIG. 1B.

The device 102 in FIG. 1B may be formed by the processing steps illustrated in FIGS. 4A and 4B and the flowchart in FIG. 5. In this process, the fibers 120 are temporarily bonded to the V-grooves 212 at joints 214 on the surfaces or side walls of V-groove 212. A portion of the fiber cladding of each fiber 120 is then removed to form a flat contact surface 410 by using a chemical etching process, a mechanical removal process, or other suitable removal processes. In general, different surfaces 410 of different fibers 120 are in the same plane above the alignment template 210. The temporary bonding between the fibers 120 and the silicon template 210 maintains the positions of fibers 120 during the cladding removal process. In general, the flat contact surface 410 may be formed by any suitable process, such as chemical mechanical polishing (CMP) process used in semiconductor fabrication.

When chemical etching is used to remove the temporarily-bonded alignment substrate 210 by first oxidizing the alignment substrate 210 and then dissolving the oxidized layer, the chemical etchant may also react with the fibers 120 because the fibers 120 are generally formed of fused silica glasses. Therefore, it is desirable to protect the fibers 120 from such etching. In one method, an etching mask layer may be formed to cover the V grooves 212 and the substrate surface 211 of the alignment substrate 210 prior to placing the fibers 120 in the V grooves 212. A silicon nitride, $Si_xN_y$, or other suitable materials, may be used for the etching mask layer. Then after the fibers 120 are bonded to the material-matched substrate 110, the chemical etching is performed to remove the alignment substrate 210. The fibers 120 are not affected by the etching because the mask layer operates as a barrier to prevent the fibers 120 from exposing to the etching chemicals. Alternatively, each fiber 120 may be directly coated with the etching mask layer prior to being laid in the V grooves 212 of the alignment template 210.

The mechanical removal of the alignment substrate 210 may be implemented by polishing off the alignment substrate 210 (e.g., the CMP process) from the substrate side opposing to the substrate surface 211. It may be sufficient to polish off the substrate 210 to the apex portions of the V grooves 212 so that remaining of the polished substrate 210 is separated into small fragments. Under this configuration, the distance to the neutral point under the thermal stress analysis caused by CTE mismatch between the fibers 120 and the small fragments of the remaining of the alignment substrate 210 is small and hence the thermal stress by the presence of such fragments is small.

In the devices 101 and 102 respectively illustrated in FIGS. 1A and 1B, the end facets of fibers 120 may be polished to form optical surfaces for optical coupling to other optical devices or elements, such as pigtailing to planar waveguides or other polished fiber facets. The polishing step may be performed either when the fibers 120 are still pressed between the silicon template 210 and the substrate 110 or when the fibers 120 are still bonded to the silicon template 210.

Figure 6:
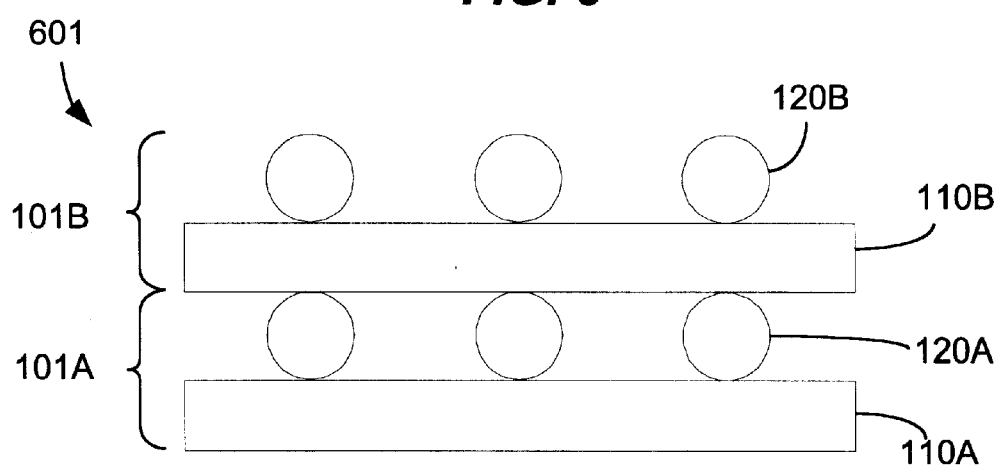
FIG. 6 shows one embodiment of a fiber device that stacks two fiber devices in FIG. 1A.

The fiber devices 101 and 102 respectively illustrated in FIGS. 1A and 1B may also be stacked with other similar fiber devices to form a three-dimensional "fiber-on-glass substrate" structure. FIG. 6 illustrates one embodiment 601 where two fiber devices 101A and 101B based on the design in FIG. 1A are stacked over each other. In fabrication, each of the fiber devices 101A and 101B may be made as described above. Next, the fiber device 101B is placed over the device 101A with the substrate 110B in contact with fibers 120A. The fibers 120A and the substrate 110B can then be bonded together to form the device 601. The top cladding surfaces of the fibers 120A may be removed to form flat surfaces for increased bonding strength as suggested in the design of the fiber device 102 in FIG. 1B. Two opposing sides of each fiber 120A may be flattened with one flat surface bonded to the substrate 110B and another bonded to the substrate 110A.

Only a few embodiments are disclosed. However, it is understood that variations and enhancements may be made without departing from the spirit of and are intended to be encompassed by the following claims.

What is claimed is:

1. A method, comprising:
   placing fibers in grooves of an alignment substrate that define relative positions and orientations of said fibers;
   placing a substrate over said fibers and said alignment substrate, said substrate formed of a material that is similar to a material of said fibers;
   bonding said fibers to said substrate;
   bonding said fibers to said alignment substrate prior to bonding said fibers to said substrate; and
   removing said alignment substrate to leave said fibers bonded to said substrate.

2. The method as in claim 1, wherein said bonding includes using an adhesive to engage each fiber to said substrate.

3. The method as in claim 1, wherein said bonding includes using $CO_2$-assisted welding to engage each fiber to said substrate.

4. The method as in claim 1, wherein said bonding includes:
   applying a liquid material between said fibers and said substrate; and
   heating up said liquid material to a solidified state to bond said fibers to said substrate.

5. The method as in claim 1, wherein said removing includes a chemical etching process.

6. The method as in claim 5, further comprising: prior to placing said fibers in said grooves of said alignment substrate, forming an etching protection layer between said fibers and said alignment substrate to shield said fibers from said chemical etching process.

7. The method as in claim 6, wherein said etching protection layer is formed on each fiber as an external coating.

8. The method as in claim 6, wherein said etching protection layer is formed to cover said grooves and a respective surface of said alignment template on which said grooves are located.

9. The method as in claim 1, further comprising:
   prior to placing said substrate over said fibers and said alignment substrate, removing a portion of fiber cladding from each fiber to form a flat contact surface,
   wherein said substrate is placed on flat surfaces of said fibers.

10. The method as in claim 9, wherein said bonding of said fibers to said substrate includes a direct diffusion bonding process where a surface of said substrate and said flat surfaces are polished and brought into contact with each other to form a direct diffusion bond.

11. The method as in claim 1, wherein said fibers are formed of a fused silica glass material.

12. The method as in claim 1, wherein said fiber and said substrate have a substantially similar coefficient of thermal expansion.

13. A device, comprising:
   a substrate formed of a fused silica glass having a flat surface; and
   a fiber bonded to said flat surface;
   a plurality of additional fibers bonded to said flat surface and arranged parallel to said fiber to form a fiber array;
   a second substrate formed of a fused silica glass having first and second flat surfaces opposing each other, and bonded to said fiber array on said substrate by bonding said first flat surfaces to said additional fibers and said fiber; and
   a second fiber array of fibers bonded to said second flat surface.

14. The device as in claim 13, wherein said fiber has a side which has a portion of fiber cladding removed to form a flat contact surface, wherein said flat contact surface is bonded to said flat surface of said substrate.

15. The device as in claim 14, wherein said flat surface of said substrate is polished, and wherein said fiber is bonded to said flat surface by a direct diffusion bond.

16. The device as in claim 13, wherein said fiber is bonded to said flat surface by an adhesive.

17. The device as in claim 13, wherein said fiber is bonded to said flat surface by $CO_2$-assisted welding.

18. The device as in claim 13, wherein end facets of said fiber and said additional fibers are polished to form optical surfaces.

19. A method, comprising:
   processing a semiconductor substrate to form a plurality of grooves at selected positions and orientations over a semiconductor substrate surface;
   placing fibers in said grooves;
   placing a substrate formed of a material similar to said fibers over said fibers;
   bonding said fibers to said substrate; and
   removing said semiconductor substrate to leave said fibers bonded on said substrate by a chemical etching process.

20. The method as in claim 19, further comprising:
   removing a portion of fiber cladding of said fibers to form flat contact surfaces in a plane prior to placing said substrate; and contacting said flat contact surfaces of said fibers to said substrate, wherein said flat contact surfaces are bonded to said substrate.

21. The method as in claim 19, further comprising polishing end facts of said fibers to form optical surfaces for optical coupling.

22. The method as in claim 19, further comprising selecting said substrate to have a coefficient of thermal expansion similar to a coefficient of thermal expansion of said fibers.

23. The method as in claim 19, wherein said fibers and said substrate are formed of fused silica glass materials.

24. The method as in claim 19, further comprising: prior to placing said fibers in said grooves, forming an etching protection layer between said fibers and said semiconductor substrate to protect said fibers from said chemical etching process.

25. A method, comprising:

processing a semiconductor substrate to form a plurality of grooves at selected positions and orientations over a semiconductor substrate surface;

placing fibers in said grooves;

placing a substrate formed of a material similar to said fibers over said fibers;

bonding said fibers to said substrate; and removing said semiconductor substrate to leave said fibers bonded on said substrate, wherein said removing of said semiconductor substrate includes polishing of said semiconductor substrate.

26. A method, comprising:

processing a semiconductor substrate to form a plurality of grooves at selected positions and orientations over a semiconductor substrate surface;

placing fibers in said grooves;

placing a substrate formed of a material similar to said fibers over said fibers;

bonding said fibers to said substrate;

removing said semiconductor substrate to leave said fibers bonded on said substrate;

placing a second substrate formed of a material similar to said fibers by contacting a first flat surface of said second substrate with said fibers, wherein said second substrate has a second flat surface opposing said first flat surface and has a fiber array bonded to said second flat surface; and bonding said first flat surface and said fibers together.

27. The method as in claim 26, wherein said removing of said semiconductor substrate includes a chemical etching process.

28. The method as in claim 26, further comprising: prior to placing said fibers in said grooves, forming an etching protection layer between said fibers and said semiconductor substrate to protect said fibers from said chemical etching process.

29. The method as in claim 26, wherein said removing of said semiconductor substrate includes polishing of said semiconductor substrate.

* * * * *